United States Patent
Foltin

(10) Patent No.: US 10,814,813 B2
(45) Date of Patent: Oct. 27, 2020

(54) METHOD FOR PROTECTING OCCUPANTS OF A MOTOR VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 15/890,672

(22) Filed: Feb. 7, 2018

(65) Prior Publication Data
US 2018/0222426 A1   Aug. 9, 2018

(30) Foreign Application Priority Data

Feb. 8, 2017  (DE) .......................... 10 2017 201 937
Apr. 5, 2017  (DE) .......................... 10 2017 205 799

(51) Int. Cl.
*B60R 21/0134* (2006.01)
*B60R 22/46* (2006.01)
*B60R 21/01* (2006.01)
*B60R 21/00* (2006.01)

(52) U.S. Cl.
CPC .......... *B60R 21/0134* (2013.01); *B60R 22/46* (2013.01); *B60R 2021/0048* (2013.01); *B60R 2021/01013* (2013.01); *B60R 2021/01211* (2013.01); *B60R 2021/01272* (2013.01)

(58) Field of Classification Search
CPC .......................... B60R 21/01334; B60R 22/46
See application file for complete search history.

(56) References Cited

U.S. PATENT DOCUMENTS

| 7,059,444 B2 * | 6/2006 | Kachu .................. B60R 21/013 180/268 |
| 9,817,397 B1 * | 11/2017 | Larner ................. B60R 21/013 |
| 2006/0162982 A1 * | 7/2006 | Lich ...................... B60R 21/013 180/271 |
| 2007/0282505 A1 * | 12/2007 | Bolton .................... B60R 21/02 701/45 |
| 2009/0076685 A1 * | 3/2009 | Beisheim ............... B60R 22/46 701/45 |
| 2013/0184940 A1 * | 7/2013 | Stoll ...................... B60R 21/01 701/45 |
| 2013/0218419 A1 * | 8/2013 | Lind ...................... B60R 21/00 701/45 |

* cited by examiner

*Primary Examiner* — Nicholas K Wiltey
*Assistant Examiner* — Tiffany K Luu
(74) *Attorney, Agent, or Firm* — Norton Rose Fulbright US LLP; Gerard Messina

(57) ABSTRACT

A method for protecting an occupant of a motor vehicle in the case of an imminent collision with a collision object includes: recognizing that a collision with the collision object is imminent, analyzing the collision object and recognizing whether a particularly sensitive upper area of the motor vehicle will be affected by the collision, and at least partially suppressing a trigger signal of a protective mechanism to enable an evasive action by the occupant if it is recognized that the particularly sensitive upper area of the motor vehicle will be affected by the collision that has been recognized to be imminent.

7 Claims, 2 Drawing Sheets

METHOD FOR PROTECTING OCCUPANTS OF A MOTOR VEHICLE

CROSS-REFERENCE TO RELATED APPLICATIONS

The present application claims priority under 35 U.S.C. § 119 to DE 10 2017 201 937.9, filed in the Federal Republic of Germany on Feb. 8, 2017 and to DE 10 2017 205 799.8, filed in the Federal Republic of Germany on Apr. 5, 2017, the content of each of which are hereby incorporated by reference herein in their entireties.

FIELD OF THE INVENTION

The present invention relates to a method for protecting at least one occupant of a motor vehicle in the case of an imminent collision with at least one collision object.

BACKGROUND

Modern motor vehicles are equipped with extensive sensors and monitoring units, with the goal of increasing the level of safety for the vehicle occupants and external road users. Better systems for scanning the surroundings of the vehicle also have been and are being gradually developed in the course of the development of autonomous vehicles, which participate in road traffic without engagement of a driver.

Using such systems for the purpose of predicting possible collisions as early as possible, estimating their course and their severity, and triggering active safety systems of the vehicle, for example, belt tensioners, seat adjustments, and/or airbags, in a timely manner in the event of the occurrence of an accident is also known.

SUMMARY

In many known methods, however, it is not possible to react sufficiently flexibly and in a manner adapted to greatly varying accident situations. Therefore, in specific accident situations, extremely severe injuries of the occupants regularly occur in spite of safety measures.

Example embodiments of the present invention provide a particularly advantageous method for protecting occupants of a motor vehicle. The present invention and refinements thereof are explained hereafter in detail. Specified method steps a) through c) are preferably carried out in the specified sequence.

In step a), it is preferably recognized that a collision of the motor vehicle with a collision object is imminent. For this purpose, possible collision objects in the surroundings of the vehicle are preferably recognized, optionally an expected (future) movement trajectory being associated with any possible collision object (in particular if it is a moving object). For this purpose, a present position, a present (relative or absolute) velocity, and/or a present (relative or absolute) moving direction of the possible collision object are preferably ascertained. A relative velocity and a relative moving direction mean a velocity and a moving direction relative to the motor vehicle itself here. An absolute velocity and an absolute moving direction mean a moving direction in the resting reference system, in which the motor vehicle also moves here. Time derivatives of the movement (for example, an acceleration) can also be ascertained and taken into consideration. To determine the expected trajectory, for example, it can be assumed that the possible collision object will move further at a constant velocity in a constant direction. Such an assumption can be reasonable in particular because the described method can intervene in particular during a reaction time of a driver of the motor vehicle. Within a corresponding timespan of, for example, one second, it can be presumed that the possible collision object changes its velocity and/or its moving direction not at all or only slightly. Alternatively, a possible change of the velocity and/or the moving direction of the possible collision object can be taken into consideration. For this purpose, for example, a (spatial) range can be determined, within which the actual trajectory will be located with great probability. Furthermore, for example, it can be assumed that the velocity of the possible collision object changes proceeding from a known instantaneous value and will be within a specific range with great probability. It can be assumed that the range becomes greater with greater distance from the instantaneous point in time. This means that a prediction of the velocity is assumed to be more inaccurate the more remote the observed point in time is. A relative velocity and a relative moving direction of a collision object can also be ascertained from absolute velocity and absolute moving direction of the collision object and the velocity and the moving direction of the motor vehicle.

Furthermore, an expected (future) trajectory of the motor vehicle is optionally determined. Pieces of information which are determinable via sensors of the motor vehicle can be used for this purpose in particular. These can be, for example, a previous curve of the velocity, an instantaneous velocity, a previous curve of the moving direction, an instantaneous moving direction, an operating state (for example, an engine speed or a presently engaged gear of a transmission) and/or a mass (in particular including a cargo load) of the motor vehicle and/or a state of the roadway (in particular relating to slickness, wetness, adhesion, and/or gradient). The expected trajectory of the motor vehicle can be determined particularly well and in particular more accurately by the sensors present in the motor vehicle than the expected trajectory of a possible collision object. Additionally or alternatively, the trajectory of the motor vehicle can be a previously planned trajectory, which the system planned for the motor vehicle to drive along. Such a planned trajectory regularly exists in vehicles which are in a mode of automated driving. It can also be assumed for the motor vehicle that it will move further, for example, at constant velocity in a consistent direction. A possible change of the velocity and/or the moving direction of the motor vehicle and of the possible collision object can also be taken into consideration.

The expected trajectory of the motor vehicle is preferably (at least implicitly) compared to the expected trajectories of all recognized possible collision objects. An at least partial overlap of the expected trajectory of the motor vehicle with an expected trajectory of a possible collision object indicates an imminent collision. In the case of an uncertainty with respect to a possible collision, the probability of a collision is possibly also determined. If this probability is greater than an established minimum value, it is thus preferably assumed that a collision is imminent.

In step b), the at least one collision object is preferably analyzed in such a way that it can be recognized whether the particularly sensitive upper area of the motor vehicle will be affected by the imminent collision. Heads of the vehicle occupants, for example, can frequently be located in the particularly sensitive upper area of the motor vehicle, and can be injured, for example, if the windshield is pushed in.

In order to protect the particularly sensitive upper area of the motor vehicle in particular, it is preferably analyzed in particular in step b) how large the collision object is and/or at what height a mass center of gravity of the collision object is located. It is preferably also analyzed whether the collision object has a protruding area, under which the motor vehicle can end up during a collision, so that particularly severe damage of a particularly sensitive upper area of the motor vehicle can occur.

In the case that an imminent collision is recognized in step b), in which damage of the particularly sensitive upper area of the motor vehicle is to be expected, step c) is preferably carried out.

If step c) is carried out, a trigger signal of a protective mechanism provided for collisions is thus at least partially suppressed in order to enable evasive action by the at least one occupant. A protective mechanism is in particular a belt tensioning mechanism for tensioning a belt here. However, it also includes any other mechanism which can be used for the purpose of moving an occupant into a suitable position for an accident and/or for reducing the mobility of an occupant in an accident situation. A further example of a protective mechanism is, for example, an airbag and/or an electromechanically adjustable seat, which can also be referred to as a crash-active seat.

The belt tensioning mechanism is preferably intended and configured for the purpose of tensioning, i.e., shortening, a (safety) belt of an occupant during a collision. The occupant is pressed against the seat by the belt tensioning mechanism and thus moved into an upright sitting position, which is regularly optimal for a (regular) accident, and held therein. Such a regular accident is typically an accident with another motor vehicle. The safety functions of a motor vehicle are normally designed for such regular accidents. Accidents in which particularly sensitive areas of a motor vehicle are affected by a collision object sometimes differ from such regular accidents with a motor vehicle.

In subsequent method steps d) and e) (after an occupant has had sufficient time for evasive action), belt tensioning can still subsequently take place if necessary, in order to retract belt loops (which may also be referred to as slack). Belt tensioning is typically carried out using belt tensioning mechanisms. Belt loops are areas of the belt at which the belt is spaced apart from the body of the occupant (for example, because of clothing of the occupant). In case of a collision, injuries of the occupant can occur due to the belt loops if the occupant initially moves unimpeded and is subsequently stopped abruptly by the belt. Such injuries can be avoided or at least reduced if the belt loops have been retracted sufficiently rapidly already before the collision or in any case immediately after the collision. Such belt tensioning mechanisms are normally used in the event of accidents. A belt tensioning mechanism can include, for example, a pyrotechnic device, which is configured for a (sudden) roll-up of the belt in case of a collision. The belt tensioning mechanism can also be driven pneumatically, electromechanically, and/or mechanically (for example, using a pre-tensioned spring).

In principle, the belt tensioning mechanism can contribute to avoiding or at least reducing injuries to occupants in the event of collisions of the motor vehicle. However, there can also be accident situations in which the belt tensioning mechanism even increases the risk of injury of the occupants. This can be the case in particular in the event of collisions in which the particularly sensitive upper area of the motor vehicle is affected in particular, i.e., in particular in the case of those imminent collisions which are preferably recognized in step b). If an occupant is seated bent forward on a seat, for example, he/she can thus be brought into an upright sitting position, which is therefore particularly vulnerable in this type of collision, because of the belt tensioning mechanism. If a collision object breaks through the windshield, for example, the occupant is better protected in the bent forward position, in particular if the head of the occupant is located outside the particularly sensitive upper area of the motor vehicle in this position.

The described method can contribute to reducing the described risk of injury due to the belt tensioning mechanism. This can be achieved in that according to step c), triggering of the belt tensioning mechanism is at least partially suppressed if a corresponding imminent collision is recognized. A corresponding imminent collision is to be understood as one in which the particularly sensitive upper area of the motor vehicle will be affected, i.e., in particular one which is preferably recognized in step b).

In the event of a corresponding collision, the occupant can move him/herself into a protective position, for example, by bending forward. A human protective reflex can be utilized in particular. Such an evasive action can be enabled according to step c) in that the restraining belt tensioning mechanism is not triggered or is only triggered to a reduced extent. If the belt is not tensioned or is only tensioned to a reduced extent (in comparison to an otherwise typical tensioning), the occupant can remain in the already assumed protective position. If the occupant has bent forward, for example, and holds his/her head below the windshield, it is thus possible to prevent, by way of step c), the occupant from being moved into a more vulnerable sitting position by the belt tensioning mechanism. It can optionally also be checked whether the occupant is already located in a good protective position and to what extent the occupant would be moved away from this protective position again by belt tensioning. If moving the occupant away from a good protective position is not threatened, the belt tensioning can possibly also be carried out as usual.

The triggering of the belt tensioning mechanism preferably takes place electronically, i.e., for example, by way of the trigger signal, which can be output by a control unit. The intervention according to step c), i.e., the at least partial suppression of the triggering of the belt tensioning mechanism, preferably takes place in the control unit, by suppressing or modifying the trigger signal for triggering the belt tensioning mechanism therein. A modified trigger signal can be in particular a signal for reduced triggering of the belt tensioning mechanism. The reduced triggering of the belt tensioning mechanism can include, for example, the belt being tensioned with only 50% of the force otherwise applied.

In addition to the at least partial suppression of the belt tensioning mechanism, the triggering of an airbag and/or a further restraint system is preferably also at least partially suppressed. This applies in particular to airbags in the front area of the motor vehicle, by which the occupants can be restrained on the front seats, for example, in the event of a rear-end collision. It can thus be prevented that an occupant is able to assume the protective position due to the suppressed belt tensioning, but subsequently be moved back into a more upright and/or unfavorable sitting position by the airbag or even be affected by the airbag in a position in which the occupant could very easily be injured.

The described method preferably intervenes only for occupants in particularly vulnerable areas of the motor vehicle. If only the left side of the motor vehicle is affected by a collision (with an established minimum probability), for example, a belt tensioning of the belt of the driver (who sits on the left) is thus preferably suppressed, while the belt of the passenger is preferably tensioned. In particular, it is preferable for a penetration depth of the collision to be taken into consideration. This means that, for example, in the event of an imminent collision at only low impact velocity, there is no intervention via the described method for the occupants of the rear seat row, and accordingly no suppression of the belt tensioning takes place.

In one preferred example embodiment of the method, in step a), the surroundings of the motor vehicle are monitored for possible collision objects at least with the aid of a surroundings sensor of the motor vehicle.

The surroundings of the motor vehicle are preferably monitored at least for the duration of an operation of the motor vehicle. The surroundings sensor preferably includes at least one external camera and/or an infrared sensor. An area in the radius of 200 m, but at least 30 m around the motor vehicle is preferably monitored in any case using the surroundings sensor. It is preferred that of such a radius around the motor vehicle an angular section of at least 40°, and more preferably at least 90°, which is located ahead of the motor vehicle in the travel direction of the motor vehicle, is monitored. The surroundings sensor is preferably connected to the control unit of the motor vehicle. It is preferably be ascertained by the control unit using software from signals of the surroundings sensor whether possible collision objects are located in the (monitored) surroundings of the motor vehicle.

In another preferred example embodiment of the method, the imminent collision recognized in step b) corresponds to an underride situation, in which at least a section of the motor vehicle ends up under the collision object.

The underride situation can be, for example, an accident situation in which in particular the engine hood of the motor vehicle ends up under a protruding part of the collision object. The protruding part of the collision object can be in particular a platform of a truck, which extends beyond a rear axle of the truck. The protruding area can also be, for example, a bar which protrudes from a cargo platform of a vehicle. The described method is preferably also sensitive, however, to immobile collision objects having a corresponding protruding area, for example, a rock spur or a ledge or, for example, a fallen tree.

If the motor vehicle is decelerated only slightly or not at all during such an underride of the collision object, the windshield of the motor vehicle can thus strike at high velocity on the protruding part of the collision object. In particular, in the event of such collisions, the triggering of the belt tensioning mechanism can be disadvantageous and is therefore preferably at least partially suppressed according to step c).

In another preferred example embodiment of the method, the particularly sensitive upper area of the motor vehicle is an area above an engine hood of the motor vehicle.

In particular, the particularly sensitive area of the motor vehicle preferably includes at least the windshield and A-columns (i.e., vehicle body structures of the motor vehicle which support a roof of the motor vehicle in the area of the windshield). The particularly sensitive upper area of the motor vehicle may be significantly damaged by an impact of a part of a collision object on the windshield and/or on the A-columns. The upper area of the motor vehicle is particularly sensitive, inter alia, because this area has particularly short crumple zones and therefore deformations can occur particularly easily in the upper area, which cause an adverse effect on the occupants located in the motor vehicle. The upper area of the motor vehicle is additionally particularly sensitive because a penetration of collision objects into the motor vehicle can occur particularly easily here.

In another preferred example embodiment, it is ascertained at which points, for example, left, right, or on both sides, the collision with the particularly sensitive area will take place. Additionally or alternatively, it can be ascertained to what extent the penetration into the particularly sensitive area is expected to take place. The seats which are vulnerable by a penetration into the particularly sensitive area can be protected particularly well using the present method, the present method not being carried out for seats which are not vulnerable by a possible penetration. In particular, no suppression of the belt tensioning takes place. Particularly vulnerable areas of the vehicle are thus particularly protected by the present method and at the same time areas which are not vulnerable are protected by already existing protective mechanisms. An adaptation to the individual seats and occupants and/or seats positions in the vehicle is accordingly advantageous.

In another preferred example embodiment of the method, the imminent collision recognized in step b) is a collision with an animal, whose center of gravity is recognized to lie above the engine hood of the motor vehicle.

In particular in the event of a collision with a large animal as the collision object, occupants of the motor vehicle can be injured. This can be the case in particular if legs of the animal are so long that the torso of the animal (in particular before the collision) is located at a height of a windshield of the motor vehicle. This can be so, for example, in the case of a moose, a horse, or a cow. In this case, the animal (and in particular its torso) can strike nearly unimpeded on the windshield of the motor vehicle. The windshield and further areas above the engine hood, for example, can be extremely deformed, pushed in, or even torn off, so that the occupants can be severely injured, if they are at least partially located in the area.

In the case of a motor vehicle having an (essentially) horizontally situated engine hood, the torso of the animal can move nearly unimpeded over the engine hood and strike against the windshield. In the case of such a motor vehicle, the particularly sensitive upper area therefore preferably includes at least the area above the engine hood, in particular the passenger compartment of the vehicle above the engine hood. This is also the case with engine hoods that are not situated horizontally or are situated (essentially) vertically and very short engine hoods, where the torso of the animal is located, for example, directly at the height of the windshield and strikes directly on the windshield, without previously having to move along a distance over the engine hood of the motor vehicle.

In another preferred example embodiment of the method, the imminent collision recognized in step b) is a collision with a truck.

A particularly high risk of injury for occupants of a motor vehicle can result in the event of a collision (in particular a rear-end collision) with a truck. In the event of such a collision, in particular the front area of the motor vehicle with the engine hood can end up under a cargo platform of the motor vehicle. In particular, if a rear sill of the truck (i.e., the rear edge of the cargo platform) is situated particularly high and/or particularly far from a rear axle of the truck, the windshield of the motor vehicle can strike, for example, in the event of a rear-end collision nearly unimpeded on the rear sill of the truck. The particularly sensitive upper area of the motor vehicle can be damaged particularly heavily in this case and the occupants of the motor vehicle can be particularly severely injured.

In another preferred example embodiment of the method, in step c), a belt tensioning which has already taken place can be canceled again if a corresponding imminent collision has been recognized in step b).

There can be situations in which, for example, a belt tensioning was triggered before it was recognized that the particularly sensitive upper area of the motor vehicle will be affected by the imminent collision. If a belt has already been tensioned, this can stop the occupant from moving him/herself into a protective position. In this example embodiment of the method, an evasive action by the occupant can also still be enabled if a belt tensioning has already taken place. For this purpose, the belt tensioner is preferably designed as a reversible belt tensioner, in the case of which a belt tensioning can be canceled out again, in particular by an electronic signal.

In another preferred example embodiment of the method, in step c), a locking of a belt which has already taken place is canceled again if a corresponding imminent collision has been recognized in step b).

To restrict the mobility of an occupant as little as possible, a belt can in principle have a variable length. The length of the belt can adapt itself to a sitting position of the occupant. For example, using a spring, a part of the belt can be wound and unwound on a roll for the length change. In the event of sudden movements of the occupant, the belt preferably locks. This means that the belt preferably can no longer be lengthened. In case of a collision (which may be the cause of the sudden movement of the occupant), a movement of the occupant can thus be suppressed. The belt can therefore protect the occupant from impact injuries. When it is indicated here that the belt can no longer lengthen, this means that forces below a predefined maximum force level can no longer result in an extension of the belt. As a safety function, it is optionally also possible that the belt extends further in the event of greater forces. The maximum force exerted on the occupant by the belt is therefore limited, for example, also to avoid injuries due to the belt. Such a maximum force level can possibly also be changed (for example, increased) within the scope of the method described here, if a belt tensioning has been suppressed. Such a maximum force level is preferably adapted to changed positions of the occupants of the motor vehicle.

In the event of collisions in which the particularly sensitive upper area of the motor vehicle is affected, such locking may increase the risk of injury of an occupant, however, because of limitations on the occupant's ability to move with an evasive action into a protective position. In this example embodiment, the locking of the belt is therefore preferably canceled out. This can take place, for example, in that a locking device is released by pyrotechnics or, for example, via the activation of a magnet.

In another preferred example embodiment of the method, the locking is at least partially and/or temporarily suppressed if a corresponding imminent collision has been recognized in step b).

In this example embodiment, the described disadvantageous consequences of the locking of the belt can also be avoided in the case in which the locking of the belt has not yet taken place. It is preferred that the locking be completely suppressed, so that in the event of a corresponding collision, locking does not take place at any time. Alternatively, it is preferred that the locking be at least delayed. The occupant can therefore initially move into a protective position. However, before the collision takes place, the occupant can be fixed in his protective position assumed in this way by locking the belt. Impact injuries may thus be avoided or at least reduced.

The locking can also be partially suppressed or a locking point can be shifted. For example, in the event of a corresponding collision, the occupant can initially lengthen the belt by an established length (preferably of 10 cm to 40 cm) before the belt locks. The occupant can therefore move into a protective position, in which he/she is additionally protected from impact injuries by the locking of the belt.

The lengthening of the belt can be carried out, for example, by an electromechanical lifting of the belt buckle, as is possible, for example, using a belt buckle feeder function. Additionally or alternatively, the lengthening of the belt can also be carried out by lowering the D-ring on the B-column, which can be used as the deflection point for the belt. In one particularly advantageous example embodiment, the belt force limiter can be adapted in such a way that a small amount of belt can be drawn out of the belt outlet, in spite of possible locking, with only minor application of force by the occupant.

In another preferred example embodiment of the method, after step c), the following steps take place: d) waiting out a time interval until the at least one occupant could move into a protective position, and e) generating a trigger signal for at least reduced triggering of a protective mechanism.

In the case in which the protective mechanism is a belt tensioning mechanism, the reduced triggering can be, for example, a reduced tensioning of the belt, to retract belt loops. In the case in which the protective mechanism is an airbag, the reduced triggering can be, for example, an ignition of the airbag using a reduced pressure.

In this example embodiment, the triggering of the belt tensioning mechanism (or the corresponding trigger signal) is preferably initially completely suppressed in step c). The occupant can therefore move in the best possible way into the protective position. A time interval is waited out in step d) for this purpose, until the at least one occupant could move into a protective position. The time interval waited out according to step d) (in which the belt is not tensioned), is preferably dimensioned in such a way that the belt tensioning mechanism triggers according to step e), immediately before the motor vehicle is decelerated due to the collision. In step e), a trigger signal is generated for a reduced tensioning of the belt, to retract belt loops.

Belt loops are sections of the belt at which the belt is spaced apart from the body of the occupant (for example, because of clothing of the occupant). In the case of a collision, injuries of the occupant can occur as a result of the belt loops, if the occupant initially moves unimpededly and subsequently is abruptly stopped by the belt or the deceleration is carried out over a shorter distance, in which the occupant is coupled to the vehicle. Such injuries can be avoided or at least reduced if the belt loops are retracted sufficiently rapidly by the belt tensioning mechanism already before the collision or in any case immediately during the collision or immediately after the collision.

In step e), the belt tensioning mechanism is preferably triggered (and a corresponding trigger signal is output by the control unit) in such a way that the belt loops are retracted, but the occupant is not moved into an upright and therefore vulnerable sitting position. The tensioning of the belt in step e) preferably takes place using a force of 30% to 70%, in particular in the range of 40% to 60% of the otherwise used force (i.e., in particular the maximum possible force which can be applied by the belt tensioning mechanism).

In this example embodiment, on the one hand, it is made possible for the occupant to move into the protective position. On the other hand, the occupant can be protected in the protective position by tensioning of the belt from injuries due to the impact on the belt or due to a shortened deceleration path.

In another preferred example embodiment of the method, a belt is triggered if a corresponding imminent collision has been recognized in step b).

In this example embodiment, the occupant can move in the best possible way into a protective position. However, the protection by the belt is completely dispensed with. This may be reasonable if the negative effects of the belt significantly exceed the positive effects of the protective position. This may be the case, for example, in the event of an imminent collision, in which the motor vehicle will end up under the collision object at a large impact velocity with probability bordering on certainty. In such a case, it may be advantageous to dispense with the belt completely. The belt is preferably only triggered in the case of such an imminent collision, in which the particularly sensitive upper area of the motor vehicle will be affected with a minimum probability and in which the expected severity of the injury, for example, ascertained on the basis of the impact velocity, exceeds a minimum value.

In another preferred example embodiment of the method, a belt is lengthened if a corresponding imminent collision has been recognized in step b).

In this example embodiment, the belt is preferably lengthened in such a way that the occupant can move particularly well into a protective position. The lengthening of the belt can be described as the opposite of a belt tensioning. For example, the belt can be lengthened in that a mount and/or a deflection roller of the belt is displaced. The belt buckle can also be displaced accordingly. In particular, the lengthening of the belt can take place pyrotechnically or electromechanically.

A trigger circuit for an airbag is also to be described here, which is configured for carrying out the described method, and also a corresponding computer program and a machine-readable storage medium, on which this computer program is stored.

Further details of the present invention and an exemplary embodiment, to which the present invention is not restricted, however, will be explained in greater detail on the basis of the drawings.

DETAILED DESCRIPTION

Figure 1:
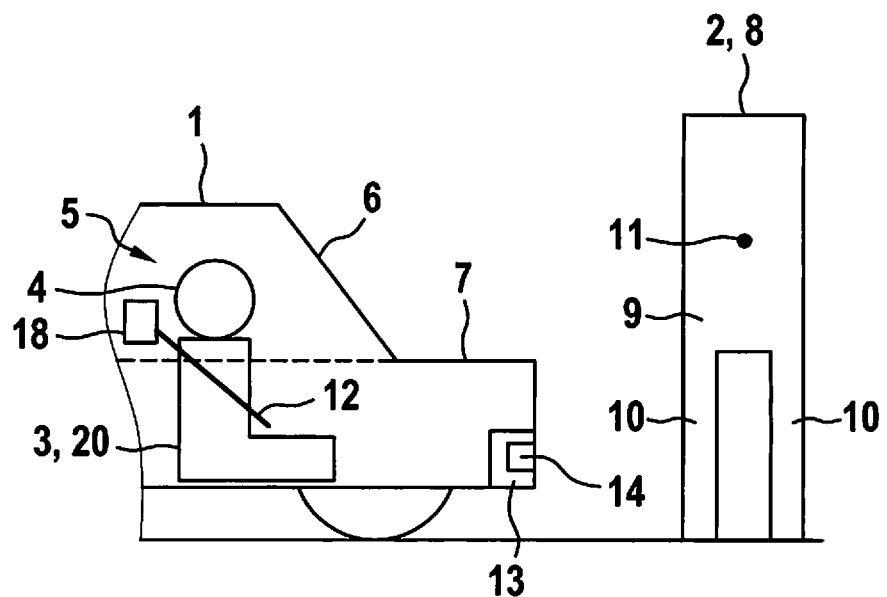
FIG. 1 shows a schematic cross-sectional view of a motor vehicle and an animal as a collision object, according to an example embodiment of the present invention.

FIG. 1 is a schematic view of a motor vehicle 1 and a collision object 2. Occupants 20, of which only a driver 3 is shown by way of example, are located inside motor vehicle 1. A head 4 of driver 3 is apparent in particular. Head 4 of driver 3 is located in a particularly sensitive upper area 5 of motor vehicle 1. A dashed line indicates how far particularly sensitive upper area 5 extends downward. In the event of a collision of motor vehicle 1 with collision object 2, particularly sensitive upper area 5 of motor vehicle 1 can be damaged particularly heavily. This may be the case in particular because collision object 2 is an animal 8, which has a mass center of gravity 11 above an engine hood 7 of motor vehicle 1, in particular due to correspondingly long legs 10. In the case of a collision, a torso 9 of animal 8 may move over engine hood 7 of motor vehicle 1 and may strike (in particular nearly unimpeded) on a windshield 6 of motor vehicle 1. In particular, to keep damage to particularly sensitive upper area 5 of motor vehicle 1 as minor as possible and to protect occupants 20 particularly well, the described method is carried out for motor vehicle 1. For this purpose, motor vehicle 1 has a surroundings sensor 13, which includes an external camera 14. Therefore, collision object 2 can be recognized and analyzed. Driver 3 is secured using a belt 12. Belt 12 can be tensioned using a belt tensioning mechanism 18 in case of a collision. The collision between motor vehicle 1 and animal 8 corresponds to an underride situation, during which engine hood 7 of motor vehicle 1 ends up underneath animal 8. The triggering of belt tensioning mechanism 18 is preferably at least partially suppressed. Injuries of occupants 20 may thus be avoided or at least reduced.

Figure 2:
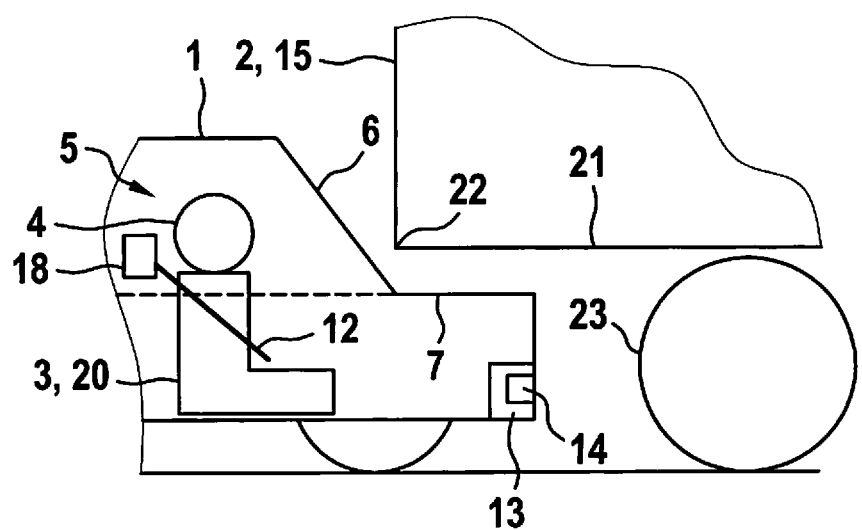
FIG. 2 shows a schematic cross-sectional view of a motor vehicle and a truck as a collision object, according to an example embodiment of the present invention.

FIG. 2 shows motor vehicle 1 from FIG. 1. Collision object 2 is a truck 15 (only partially shown) here, in contrast to FIG. 1. Truck 15 has a cargo platform 21 including a rear sill 22. If motor vehicle 1 ends up under cargo platform 21, windshield 6 of motor vehicle 1 thus strikes against rear sill 22, before the motor vehicle strikes against a rear wheel 23 of the truck (which is part of a rear axle (not shown in greater detail)). Windshield 6 can thus strike nearly instantaneously against rear sill 22. This may result in significant damage of particularly sensitive upper area 5 of the motor vehicle. The collision between motor vehicle 1 and truck 15 corresponds to an underride situation, in which engine hood 7 of motor vehicle 1 ends up under truck 15. The triggering of belt tensioning mechanism 18 is preferably at least partially suppressed in this case.

Figure 3:
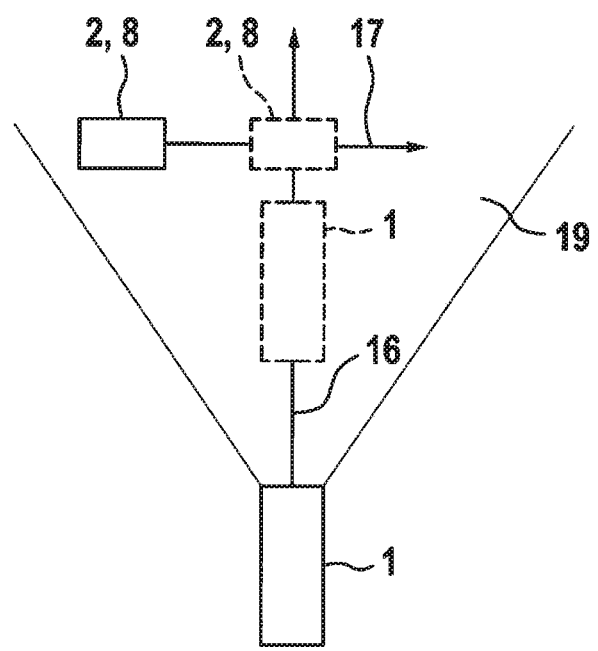
FIG. 3 shows a schematic view of the expected trajectories of the motor vehicle and the collision object, according to an example embodiment of the present invention.

FIG. 3 shows a schematic view of an expected trajectory 16 of a motor vehicle 1 and an expected trajectory 17 of a collision object 2. By way of example, reference is made here to the motor vehicle from FIG. 1, which collides with an animal 8 as collision object 2. Motor vehicle 1 and animal 8 are each shown in two positions. Solid lines show where motor vehicle 1 and animal 8 are located at a starting time. The starting time is the point in time at which animal 8 is recognized. Dotted lines show where motor vehicle 1 and animal 8 are located at the time of the collision. Furthermore, a section of surroundings 19 of motor vehicle 1 is shown. The section of surroundings 19 is monitored for possible collision objects, whereby it is recognized that a collision with animal 8 as collision object 2 is imminent. Furthermore, animal 8 is preferably analyzed so that it can be recognized whether particularly sensitive upper area 5 of motor vehicle 1 shown in FIG. 1 will be at least partially affected by the collision. If this is the case, the triggering of belt tensioning mechanism 18 will be at least partially suppressed.

Figure 4:
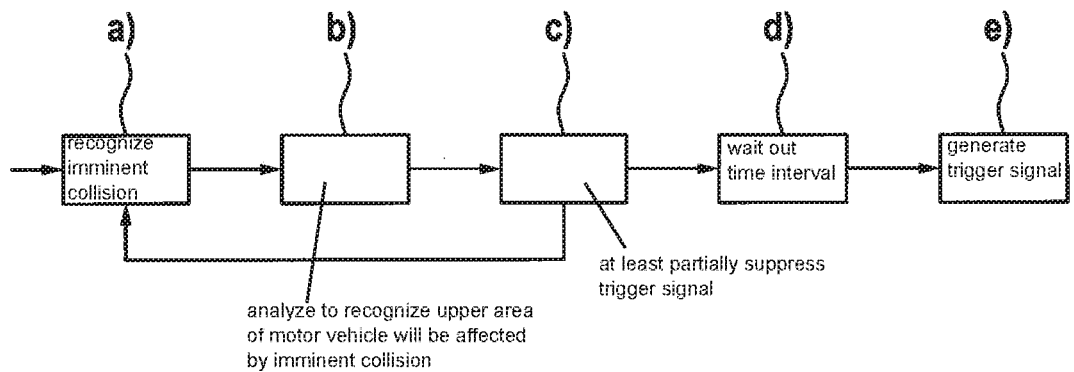
FIG. 4 shows a flowchart of a method according to an example embodiment of the present invention.

FIG. 4 is a flowchart of the described method. Method steps a) through e) are apparent, method steps a) through c) being carried out repeatedly in a loop (preferably during the entire operation of the motor vehicle). If a suppression of a trigger signal takes place in step c), method steps d) and e) are possibly initiated.

What is claimed is:

1. A method for protecting an occupant of a motor vehicle, the method comprising:

recognizing an imminent collision with a collision object;

based on the recognizing of the imminent collision with the collision object, triggering a belt tensioning mechanism to tension a safety belt of the occupant of the motor vehicle;

by analyzing the collision object, recognizing that a predefined upper area of the motor vehicle will be affected by the imminent collision, wherein the predefined upper area is an area above an engine hood of the motor vehicle; and responsive to the recognition that the predefined upper area of the motor vehicle will be affected by the imminent collision, and after the triggering of the belt tensioning mechanism, canceling the tensioning of the safety belt to enable the occupant to move into a protective position.

2. The method of claim 1, wherein the recognizing of the imminent collision includes, using a surroundings sensor of the motor vehicle, monitoring surroundings of the motor vehicle for possible collision objects.

3. The method of claim 1, wherein the recognized imminent collision is an underride situation in which at least a part of the motor vehicle ends up under the collision object.

4. The method of claim 1, wherein the recognized imminent collision is a collision with an animal whose mass center of gravity lies above the engine hood of the motor vehicle.

5. The method of claim 1, wherein the recognized imminent collision is a collision with a truck.

6. A trigger circuit for protecting an occupant of a motor vehicle, the trigger circuit comprising:

processing circuitry interfacing with a protective mechanism, wherein the processing circuitry is configured to:

recognize an imminent collision with a collision object;

based on the recognition of the imminent collision with the collision object, trigger a belt tensioning mechanism to tension a safety belt of the occupant of the motor vehicle;

by analyzing the collision object, recognize that a predefined upper area of the motor vehicle will affected by the imminent collision, wherein the predefined upper area is an area above an engine hood of the motor vehicle; and responsive to the recognition that the predefined upper area of the motor vehicle will be affected by the imminent collision, and after the triggering of the belt tensioning mechanism, cancel the tensioning of the safety belt to enable the occupant to move into a protective position.

7. A non-transitory computer-readable medium on which are stored instructions that are executable by a processor and that, when executed by the processor, cause the processor to perform a method for protecting an occupant of a motor vehicle, the method comprising:

recognizing an imminent collision with a collision object;

based on the recognizing of the imminent collision with the collision object, triggering a belt tensioning mechanism to tension a safety belt of the occupant of the motor vehicle;

by analyzing the collision object, recognizing that a predefined upper area of the motor vehicle will be affected by the imminent collision, wherein the predefined upper area is an area above an engine hood of the motor vehicle; and responsive to the recognition that the predefined upper area of the motor vehicle will be affected by the imminent collision, and after the triggering of the belt tensioning mechanism, canceling the tensioning of the safety belt to enable the occupant to move into a protective position.

\* \* \* \* \*